United States Patent [19]

Deve

[11] 4,429,642
[45] Feb. 7, 1984

[54] THERMAL RECLAIMER APPARATUS FOR A THERMAL SAND RECLAMATION SYSTEM

[75] Inventor: Vagn Deve, East Washington, Pa.

[73] Assignee: Combustion Engineering, Inc., Windsor, Conn.

[21] Appl. No.: 369,334

[22] Filed: Apr. 16, 1982

[51] Int. Cl.³ ............................................. B09B 3/00
[52] U.S. Cl. .................................... 110/236; 110/346
[58] Field of Search ....................... 110/235, 236, 346

[56] References Cited

U.S. PATENT DOCUMENTS

| | | | |
|---|---|---|---|
| 2,977,255 | 3/1961 | Lowry | 110/236 X |
| 3,685,165 | 8/1972 | Deve | 110/236 X |
| 3,705,711 | 12/1972 | Seelandt et al. | 110/236 X |

Primary Examiner—Edward G. Favors
Attorney, Agent, or Firm—Arthur E. Fournier, Jr

[57] ABSTRACT

A thermal reclaimer apparatus (14) for thermally removing from the used foundry sand the organic matter that is present therein. The subject thermal reclaimer apparatus (14) includes chamber means (26) in which the used foundry sand is heated to a predetermined temperature for a preestablished period in order to accomplish the burning away of the organic matter that the used foundry sand contains. The chamber means (26) includes inlet means (32) provided at one end thereof and outlet means (50) provided at the other end thereof. Feed means (34) are cooperatively associated with the pipe means (36) and thereby with the inlet means (32) for feeding the used foundry sand through the inlet means (32) into the chamber means (26). The subject thermal reclaimer apparatus (14) further includes rotating means (44) operative for effecting the rotation of the chamber means (26) as the used foundry sand is being heated therein. The chamber means (26) has cooperatively associated therewith burner means (40) located at the same end thereof as the outlet means (50). The burner means (40) is operative to effect the heating of the used foundry sand to the desired temperature within the chamber means (26). Tumbling means (46, 48) are provided inside the chamber means (26) to ensure that the used foundry sand is constantly turned over, i.e., tumbled, and that the lumps therein are broken up as the chamber means (26) rotates. Lastly, the used foundry sand from which the organic matter has been removed leaves the chamber means (26) through the outlet means (50).

9 Claims, 6 Drawing Figures

THERMAL RECLAIMER APPARATUS FOR A THERMAL SAND RECLAMATION SYSTEM

CROSS-REFERENCE TO RELATED APPLICATIONS

This application is hereby cross-referenced to the following four patent applications which were commonly filed herewith and which are commonly assigned: U.S. patent application Ser. No. 369,069, filed Apr. 16, 1982, entitled "Thermal Sand Reclamation System," filed in the name of Vagn Deve; U.S. patent application Ser. No. 369,068, filed Apr. 16, 1982, entitled "A Lump-Crusher and Shake-Out Apparatus For A Thermal Sand Reclamation System," filed in the name of Vagn Deve; U.S. patent application Ser. No. 369,476, filed Apr. 16, 1982, entitled "A Post Reclaimer, Cooling and Separator Assembly For A Thermal Sand Reclamation System," filed in the name Vagn Deve; and U.S. patent application Ser. No. 369,335, filed Apr. 16, 1982, entitled "A Classifying, Scrubber And Cooling Assembly For A Thermal Sand Reclamation System," filed in the name of Vagn Deve.

BACKGROUND OF THE INVENTION

This invention relates to apparatus for removing organic matter from used foundry sand, and in particular to a thermal reclaimer apparatus for thermally removing organic matter from used foundry sand by burning it away.

Although most people do not commonly view sand as being one of our Nation's diminishing natural resources, to those in the foundry field the shrinking supply of sand of the kind that is usable for foundry purposes is a matter of concern. More specifically, despite the fact that some kinds of sand may be considered to be in relatively plentiful supply, the specific type of sand which is capable of being employed for purposes of making castings through the use of processes associated with foundry operations is, generally speaking, in relatively short supply. That is, the latter type of sand, which for ease of reference will hereinafter be referred to generically by the term "foundry sand" occurs naturally in only selected locations. Thus, as the foundry sand continues to be removed from any given one of these selected locations eventually the supply of foundry sand thereat becomes exhausted. This is precisely what is taking place more and more frequently these days. As a consequence those employed in the foundry industry who are responsible for acquiring supplies of foundry sand are reaching the point where they can no longer satisfy their requirements for foundry sand simply from local sources. Rather, they are being forced to seek supplies of foundry sand from sources located at ever increasing distances from the site of the foundry at which it is intended to make use of the foundry sand.

Apart from that concern to which reference has been had hereinbefore, which those in the foundry field have with regard to the fact that available sources of supply of foundry sand are becoming fewer and fewer in number, there is yet another matter, which is of concern of those in the foundry industry. This is the matter of the increasing rise in the price of the foundry sand which is available. This increase in the cost of obtaining adequate supplies of foundry sand appears to be occasioned basically by three factors.

The first of these is the fact that sources of supply of available foundry sand are located further and further away from the individual foundry sites. Thus, that segment of the price of foundry sand which is represented by the cost of transporting the foundry sand to the foundry site is becoming a more and more significant factor in the overall cost of obtaining the foundry sand.

The second is a function of the fact that foundry sand is in dwindling supply. Namely, one finds that in the case of most items, as the item becomes less and less available, the price of the item increases in inverse relation to the extent to which the item is available. So it is in the case of foundry sand. Further, as a corollary to this, and something which is particularly true in the case of natural resources, the first of the known natural resources to be removed commonly is that which is the easiest to remove. Thereafter, only after that which is easiest to remove is removed is removal had of that which is more difficult to remove. Concomitantly, the price of the natural resource, e.g., foundry sand, increases in proportion to the cost of removing the natural resource, which in turn normally is a function of the degree of difficulty encountered in effecting the removal of the natural resource.

Yet another concern of equal, if not in some instances greater, concern faced by those in the foundry field is that presented by the fact that it is becoming increasingly more common to find that chemically-bonded sand is no longer being accepted for disposal at local disposal sites. That is, from an ecological standpoint, environmental protection agencies on the local level are prohibiting the disposal of such chemically-bonded sand at disposal sites which fall within their respective jurisdictions. Thus, those in the foundry field are in need of finding a way of accomplishing the disposal of such chemically-bonded sand in a safe and legal fashion.

As evidenced by a reference to the prior art, there have been attempts made previously in an effort to address one or more of the above-noted concerns. In this regard, the focus of one of these prior art attempts has been on an effort to effect the reclamation of foundry sand. One rationale behind this effort has been that if it were to prove possible to effect a recycling of the foundry sand, this would go far towards forestalling the exhaustion of existing sources of supply of foundry sand. Furthermore, to the extent that recycling of the foundry sand takes place at or in relatively close proximity to the individual foundry sites whereat the use was originally made of the foundry sand, the effect thereof would be to negate substantially, if not totally, the need to incur the expenses associated with the transportation of foundry sand from the sources of supply thereof to the foundry sites. In addition, the ability to reclaim used foundry sand obviates the problem associated with the need to find a suitable disposal site for the used foundry sand.

Insofar as the reclamation of used foundry sand is concerned, there are at least two major requirements, which from a practical standpoint, must be satisfied thereby. Namely, the used foundry sand after being subjected to the reclamation process must be in substantially the same condition as it originally was. That is, the reclamation process must be capable of restoring the used foundry sand to, in essence, its original condition. Secondly, the reclamation of used foundry sand must be capable of being accomplished economically. More specifically, the cost of reclamation must be such that reclamation from a financial standpoint is sufficiently attractive to render it desirable to undertake the investment in terms of time, labor and money required thereby as compared to continuing to purchase new, i.e., not previously used, foundry sand.

With respect to this matter of the reclamation of used foundry sand, a variety of different types of apparatus have been proposed for use. These apparatuses may, for ease of reference, be classified into categories according to the type of treatment to which the used foundry sand is subjected for purposes of effecting the reclamation thereof. Thus, one category into which such apparatus may be placed is that of thermal units. In accord therewith, heat is employed for purposes of accomplishing the removal of organic coatings from the sand particles. By way of exemplification in this regard, there has previously been issued on Aug. 22, 1972 to the applicant of the present invention, U.S. Pat. No. 3,685,165. The latter patent is directed in particular to an apparatus for thermally reclaiming resin coated sand.

A second category of such apparatuses is that of mechanical units. Here, reliance is had, generally speaking, on some form of abrasive action in order to effect the removal of, for example, organic coatings from the particles of sand. This abrasive action may be realized through the action of some sort of mechanical member, or through the use of a so-called "air scrubber." The latter refers to a type of device wherein the sand particles are accelerated to relatively high velocities by means of compressed air such that a rubbing action is caused to occur between individual particles of sand. In other instances, the sand particles after being accelerated are made to impinge against a suitably selected surface such that as a result of this impingement the coating fractures and separates from the individual sand particle. For purposes of illustration of a mechanical unit which has been proposed in the prior art for use in connection with the reclamation of foundry sand, reference may be had to U.S. Pat. No. 4,283,015, that issued on Aug. 11, 1981. This patent depicts an apparatus which is intended to be employed for purposes of removing no-bake coatings from foundry sand.

At this point, it is deemed important that notice be taken of the fact that one should not gain the impression that in order for one to provide a system for effecting the reclamation of used foundry sand, one need only be concerned with the matter of removing organic coatings from sand particles. For, depending on the condition of the foundry sand that it is desired to reclaim, which in turn is a function of the manner in which the foundry sand has been used, a number of other considerations may be of equal, if not greater, importance. For example, significant amounts of used foundry sand are produced during foundry operations wherein the used foundry sand is replete with organic matter, metal, dust and fines.

Attempts have been made, though, to provide systems of a mechanical type which would be commercially acceptable for use to effect the removal of organic matter, metal, dust and fines from used foundry sand. However, the mechanical systems which have been made use of commercially to date have not, particularly in terms of their operation, proven to be entirely satisfactory from a performance standpoint. For example, an undesirable feature of such commercially available prior art forms of mechanical foundry sand reclamation systems is that they frequently suffer from an inability to effect the removal, to the extent desired, of the organic matter from the foundry sand that is being reclaimed. The result, thus, is that future foundry operations are less cost effective, when used foundry sand that has been inadequately reclaimed is employed therein, because additional amounts of new sand must be mixed therewith.

Focusing attention once more on the matter of the thermal reclamation of used foundry sand, and in particular that kind of foundry sand which has organic matter, metal, dust and fines present therein, there are a number of factors to which it is desirable that consideration be given if a thermal foundry sand reclamation system is to be provided that will prove to be viable from a commercial standpoint. More specifically, such a thermal foundry sand reclamation system must be capable of accomplishing the removal of the organic matter from the used foundry sand while at the same time leaving the metal that is also present in the used foundry sand in such a form as to enable it subsequently to be readily removed. Thus, one of the factors that must be taken into account in this regard is that of being able to provide sufficient heat to the used foundry sand so that the organic matter present therein is burned away. However, the operating characteristics of the thermal system must be such that the used foundry sand is not heated excessively, i.e., to such a high temperature that the heat produced is sufficient to effect a change in the state of the metal which is present in the used foundry sand. To this end, such a thermal system for reclaiming used foundry sand must possess the capability of enabling the organic matter to be burned away, while at the same time that this is being accomplished ensuring that the metal, be it of a ferrous or nonferrous nature, which the used foundry sand contains, is not adversely affected, i.e., rendered more difficult to remove, as a consequence of being exposed to the heat that is employed to burn away the organic matter. In this regard, note is taken here of the fact that some nonferrous metals, e.g., aluminum and zinc, have a significantly different melting temperature than do ferrous metals, and consequently must be treated differently from a temperature standpoint.

Another factor which must be borne in mind when one attempts to provide such a thermal system for reclaiming used foundry sand which contains organic matter, metal, dust and fines is that of the nature of the treatment which should be accorded to the fumes that are generated as the organic matter is being burned away. There are two aspects to this. The first is that of ensuring that such fumes do not pose a danger to the personnel who are attending to the operation of the thermal foundry sand reclamation system. The second is that of ensuring that any fumes which may be exhausted to the atmosphere do not constitute a source of pollutants. That is, that the fumes which are exhausted to the atmosphere as a consequence of the operation of such a thermal system for reclaiming used foundry sand do not violate the regulations applicable thereto as established by the cognizant local, state and federal authorities.

The third factor to which it is essential that consideration be given in providing such a thermal foundry sand reclamation system is the matter of the cost thereof. Namely, both in terms of originally providing the system and in terms of operating the system thereafter, the expenditures required thereby must be such as to render it desirable to undertake the requisite investment as compared to continuing the expenditure of the funds necessary to acquire new foundry sand rather than reclaimed foundry sand.

Related to this matter of cost, which is addressed in the preceding paragraph, is the matter of the production output of reclaimed foundry sand that can be realized through the use of such a thermal foundry sand reclamation system. Reference is had here to the fact that for such a thermal foundry sand reclamation system to be commercially viable, it is necessary that the system embody the capability of providing reclaimed foundry sand in the desired quantities, i.e., in amounts sufficient to meet the need therefor as it exists at any given site at which foundry operations capable of making use thereof take place.

In summary, the salient point which the preceding discussion serves to make is the fact that there already has been shown to exist in the prior art a need for a system which is operative to effect the reclamation of used foundry sand. And in particular the preceding discussion evidences the need in the prior art for a system that is operative to reclaim used foundry sand which contains metal of either a ferrous or nonferrous nature, organic matter, dust and fines. One of the major component parts that any such system for reclaiming used foundry sand includes is a thermal reclaimer apparatus. The latter apparatus is operative for thermally removing from the used foundry sand the organic matter that the latter contains.

As a consequence of providing such a new and improved system for reclaiming used foundry sand there has also been shown to exist a need in the prior art for a new and improved form of thermal reclaimer apparatus that would be suitable for employment for purposes of effecting the thermal removal of organic matter from used foundry sand. That is, there has been sought to be provided a thermal reclaimer apparatus which additionally is characterized by the fact that it is capable of being cooperatively associated in operative relation with the other components which together comprise the system for the reclamation of used foundry sand.

It is, therefore, an object of the present invention to provide a new and improved form of thermal reclaimer apparatus.

It is another object of the present invention to provide such a thermal reclaimer apparatus which is particularly suited for purposes of effecting the thermal reclamation of used foundry sand.

It is still another object of the present invention to provide such a thermal reclaimer apparatus which is operative for purposes of heating used foundry sand to a predetermined temperature for a preestablished period in order to accomplish the burning away of the organic matter that the used foundry sand contains.

A further object of the present invention is to provide such a thermal reclaimer apparatus which can be cooperatively associated in operative relation with the other components that together comprise a system for the reclamation of used foundry sand.

A still further object of the present invention is to provide such a thermal reclaimer apparatus which effects the burning away of the organic matter contained in the used foundry sand without producing fumes that would pose either a danger to the personnel attending to the operation of the thermal reclaimer apparatus or would constitute a pollutant if exhausted to the atmosphere.

Yet a further object of the present invention is to provide such a thermal reclaimer apparatus which embodies means operative for ensuring that all of the used foundry sand which enters the thermal reclaimer apparatus is exposed to the combustion process.

Yet another object of the present invention is to provide such a thermal reclaimer apparatus which is characterized in the fact that it is easy to employ, is reliable in operation, yet is relatively inexpensive to provide.

SUMMARY OF THE INVENTION

In accordance with the present invention, there is provided a new and improved thermal reclaimer apparatus for effecting the thermal removal of organic matter from used foundry sand. The subject thermal reclaimer means includes a cylindrical chamber into which the used foundry sand is fed at a controlled rate through an inlet opening formed at one thereof. Hydraulic feed means is cooperatively associated with the inlet opening of the cylindrical chamber. The hydraulic feed means, which may be made to operate either automatically or manually, is operative to feed the used foundry sand in predetermined quantities into the cylindrical chamber. At the other end thereof, the cylindrical chamber is provided with a suitable dimensioned outlet opening through which the used foundry sand, after the organic matter has been removed therefrom, is discharged. Burner means are provided at the same end of the cylindrical chamber as that from which the used foundry sand is discharged. The burner means includes a burner pipe that projects into the interior of the cylindrical chamber. Hot gases are discharged from the burner pipe and are operative to effect a heating of the used foundry sand to a sufficiently elevated temperature as to cause the organic matter in the used foundry sand to be burned away. Rotating means are cooperatively associated with the cylindrical chamber for purposes of imparting a rotational motion to the cylindrical chamber and, therefore, also to the used foundry sand that is contained therein. Within the interior of the cylindrical chamber, there are suitably provided a plurality of pin-like members and comb-like members that are operative to cause the used foundry sand to undergo a tumbling action, i.e., to cause the used foundry sand to constantly turn over, as the cylindrical chamber is made to rotate such as to insure that all of the used foundry sand is exposed to the hot gases that spew from the burner pipe and that the lumps which the used foundry sand contains are broken up.

DESCRIPTION OF A PREFERRED EMBODIMENT

Figure 1:
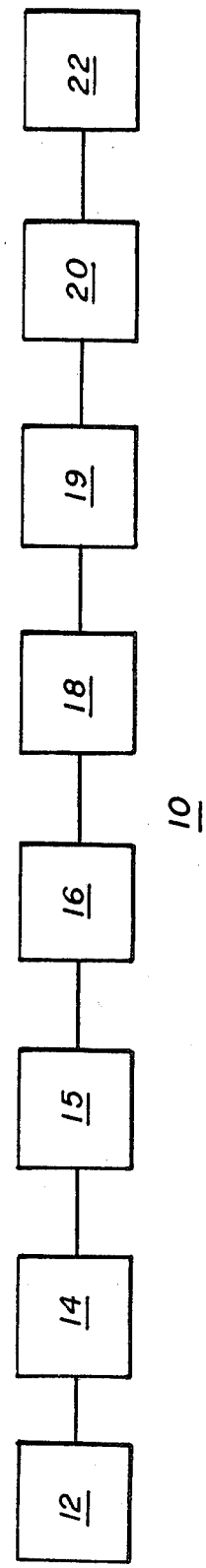
FIG. 1 is a block diagram of a thermal sand reclamation system that embodies a thermal reclaimer apparatus constructed in accordance with the present invention.

Referring now to the drawing, and more particularly to FIG. 1 thereof, there is depicted therein in block diagram form a thermal sand reclamation system, generally designated by reference numeral 10. The thermal sand reclamation system 10 forms the subject matter of the invention being claimed in copending U.S. patent application Ser. No. 369,069, entitled "Thermal Sand Reclamation System," which has been filed in the name of the same inventor as the present application, and which is assigned to the same assignee as the present application. Accordingly, reference may be had to this copending patent application for a complete description and illustration of the thermal sand reclamation system 10.

However, for purposes of acquiring an understanding of the subject matter of the invention to which the present patent application is directed, a brief description of the nature of the construction of the thermal sand reclamation system 10 follows hereinafter. To this end, the thermal sand reclamation system 10 is intended to be utilized for purposes of effecting the reclamation of used foundry sand, and in particular used foundry sand of the kind which has therein organic matter and metal of either a ferrous or nonferrous nature, dust and fines. As best understood with reference to FIG. 1, the thermal sand reclamation system 10 includes a multiplicity of components that are suitably arranged so as to be cooperatively associated in series relation one with another. More specifically, as shown in FIG. 1, the thermal sand reclamation system 10 comprises the following: a lump-crusher and shake-out apparatus, generally designated by reference numeral 12, which is operative for purposes of effecting the preparation of used foundry sand for subsequent reclamation; a thermal reclaimer means, generally designated by reference numeral 14, which forms the subject matter of the invention to which the present patent application is directed and, thus, to which further reference will be had hereinafter; post reclaimer apparatus, generally designated by reference numeral 15, which is operative to provide the used foundry sand with additional residence time in order to complete the burning away of the organic matter; a primary cooling apparatus, generally designated by reference numeral 16, which is operative to effect a cooling of the used foundry sand from which the organic matter has been removed; a separator apparatus, generally designated by reference numeral 18, which is operative for purposes of effecting a separation from the used foundry sand of the metala that is present therein; a classifying and dust removal apparatus, generally designated by the reference numeral 19, which is operative to effect classification of the used foundry sand and to effect a removal of the dust and fines; a scrubber apparatus, generally designated by reference numeral 20, which is operative for purposes of effecting a scrubbing of the used foundry sand to dislodge dust that the sand particles may embody; and a secondary cooling apparatus, generally designated by reference numeral 22, which is operative for purposes of effecting additional cooling of the used foundry sand after the organic matter, the metal, the dust and the fines have been removed therefrom.

Turning now to a description of the thermal reclaimer apparatus 14 of the present invention, reference will be had for this purpose in particular to FIGS. 2-6 of the drawing. First, however, note is made here of the fact that the thermal reclaimer apparatus 14 is operative to effect the removal from the used foundry sand of the organic matter that is contained therein. More specifically, through the use of thermal means, the organic matter which the used foundry sand contains is burned away in the thermal reclaimer apparatus 14.

Figure 2:
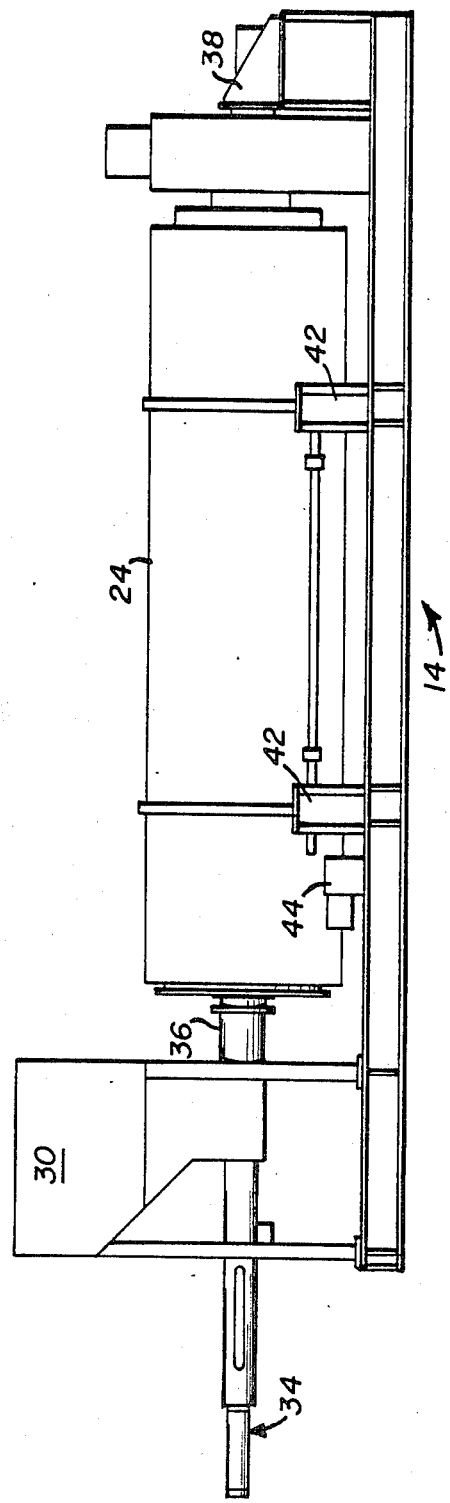
FIG. 2 is a side elevational view of a thermal reclaimer apparatus constructed in accordance with the present invention.
Figure 3:
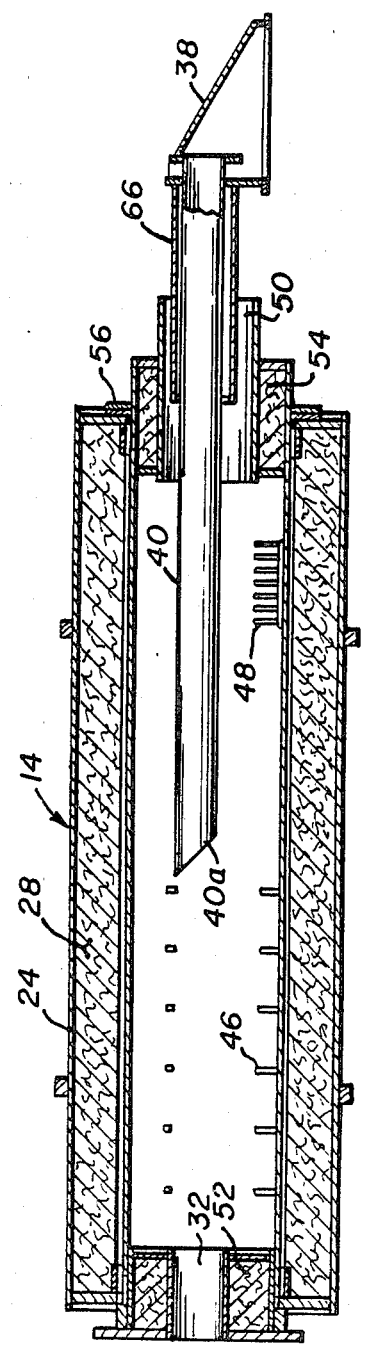
FIG. 3 is a side elevational view, partially in section, of the cylindrical chamber of a thermal reclaimer apparatus constructed in accordance with the present invention.

In accord with the preferred embodiment of the invention and as best understood with reference to FIGS. 2 and 3 of the drawing, the thermal reclaimer means 14 includes a substantially cylindrically shaped housing 24. Internally thereof and concentric therewith, there is provided a cylindrical chamber 26. It is within this cylindrical chamber 26 that the organic matter which is present in the used foundry sand is burned away in a manner that is yet to be described. Suitable insulation 28 is provided intermediate the cylindrically shaped housing 24 and the cylindrical chamber 26 for purposes of effecting the retention in the cylindrical chamber 26 of the heat that is produced therein for purposes of accomplishing the burning away of the organic matter in the used foundry sand.

The used foundry sand which contains the organic matter is fed to the thermal reclaimer apparatus 14 from a suitable supply thereof such as from the lump-crusher and shake-out apparatus 12 of the thermal sand reclamation system 10 of FIG. 1. Namely, in accord with the illustration of FIG. 2, the used foundry sand containing the organic matter is fed to a suitably dimensioned hopper 30 from whence the used foundry sand is thereafter fed at a controlled rate into the interior of the cylindrical chamber 26. The used foundry sand enters the cylindrical chamber 26 through the opening 32. The latter is provided for this purpose at the left end of the thermal reclaimer apparatus 14 as viewed with reference to FIG. 3. More specifically, the used foundry sand containing the organic matter is preferably injected into the cylindrical chamber 26 by hydraulic means, the latter being denoted generally by the reference numeral 34 in FIG. 2. To this end, the plunger means (not shown) associated with the hydraulic means 34 is operative in a manner well-known to those skilled in the art of hydraulic feed means to propel a charge consisting of a predetermined quantity of used foundry sand through the inlet opening 32 into the cylindrical chamber 26. That is, the mode of operation of the plunger means (not shown) is such that with the plunger means (not shown) in its retracted position, used foundry sand from the hopper 30 occupies the area in front of the plunger means (not shown) such that as the latter moves to its forward, i.e., extended, position the used foundry sand is forced by the plunger means (not shown) through the inlet opening 32, and more specifically, through a pipe 36 that is emplaced within the inlet opening 32 into the cylindrical chamber 26. The hydraulic feed means 34, without departing from the essence of the invention, may be operated either automatically or manually to provide the desired quantity of used foundry sand to the cylindrical chamber 26, i.e., to effect the passage of used foundry sand in suitable quantities through the inlet opening 32 into the cylindrical chamber 26.

Continuing with the description of the thermal reclaimer means 14 of FIGS. 2-6 of the drawing, a burner means 38 is suitably mounted in supported relation at the right end, as viewed with reference to FIG. 3, of the cylindrically shaped housing 24. More specifically, the burner means 38 includes a burner pipe 40 which projects into the cylindrical chamber 26 for a predetermined distance. The fuel which is employed for purposes of accomplishing the burning away of the organic matter in the used foundry sand is fed from a suitable source of supply thereof to and through the burner pipe 40 into the interior of the cylindrical, i.e., combustion, chamber 26.

The cylindrically shaped housing 24 of the thermal reclaimer means 14 is suitably mounted for rotation in bearing means 42. To this end, the thermal reclaimer apparatus 14 may be provided with any suitable conventional form of rotating means 44, which is capable of imparting rotation to the housing 24. That is, the rotating means 44 is designed to be operative for purposes of effecting the rotation of the cylindrically shaped housing 24 relative to the burner means 38 and the inlet means, i.e., opening, 32 through which the used foundry sand is made to enter the cylindrical chamber 26.

The used foundry sand in which the organic matter is present that enters the cylindrical chamber 26 through the inlet opening 32 travels the length of the cylindrical chamber 26, i.e., from left to right as viewed with reference to FIG. 3, as the cylindrically shaped housing 24 is caused to rotate by the rotating means 44. During the course of this travel, the organic matter in the used foundry sand is burned away. To this end, the temperature to which the the used foundry sand is heated is preselected so as to be high enough to accomplish the burning away of the organic matter, yet low enough so that the metal which the used foundry sand also contains is not adversely affected by the heat.

In accord with the preferred embodiment of the invention, if the metal which the used foundry sand contains is of a ferrous nature, the temperature to which the used foundry sand is heated is approximately 1300° F. On the other hand, if the metal which the used foundry sand contains is a nonferrous metal such as aluminum which has a melting temperature of less than 1500° F., the temperature to which the used foundry sand is heated is approximately 900° F. Moreover, in the case of nonferrous metal such as aluminum, in order to accomplish the complete removal of the organic matter which the used foundry sand contains, it is necessary to subject the used foundry sand to a second pass through either the same cylindrical chamber 26 or through a second cylindrical chamber 26. Furthermore, in the case of such nonferrous metals having a melting temperature of less than 1500° F., the metal is sifted, i.e., separated, from the used foundry sand before the latter is passed a second time through a cylindrical chamber 26. In this regard, since the nonferrous metal is sifted from the used foundry sand between the first and second passes through a cylindrical chamber 26, there is no restriction against heating the used foundry sand during its second pass through a cylindrical chamber 26 to a temperature approximating 1300° F. for purposes of completing the removal, i.e., burning away, of the organic matter that the used foundry sand contains.

It is also to be noted here that the speed of rotation of the cylindrically shaped housing 24 is also preselected. That is, the speed of rotation is selected to be such that the sand in moving through the cylindrical chamber 26 is provided with a sufficiently long residence time therein in order so that the desired burning away of the organic matter in the used foundry sand can take place. To this end, when the metal which the used foundry sand contains is of a ferrous nature, an appropriate residence time in this connection is approximately two hours. On the other hand, in the case of nonferrous metals that require two passes of the used foundry sand through a cylindrical chamber such as the chamber 26, a comparable adjustment must be made in the residence time to which the used foundry sand is subjected during each pass through the cylindrical chamber 26.

Figure 4:
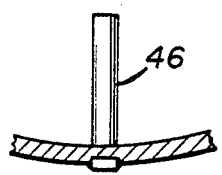
FIG. 4 is a side elevational view of a pin-like member employed in a thermal reclaimer apparatus constructed in accordance with the present invention.

As best understood with reference to FIGS. 3 and 4 of the drawing, there are preferably provided for purposes of assisting in the removal by thermal means of the organic matter which the used foundry sand contains a plurality of pin-like members 46 suitably supported on the inner wall of the cylindrically shaped housing 24 such that each projects into the interior of the cylindrical chamber 26. As seen with reference to FIG. 3 of the drawing, the pin-like members 46 are positioned in spaced relation one to another and preferably are limited to being located in essentially only the left half of the cylindrical chamber 26 as viewed with reference to FIG. 3.

Figure 5:
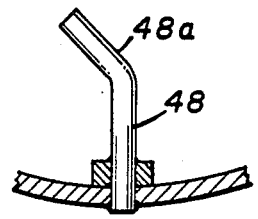
FIG. 5 is a side elevational view of a portion of a comb-like member that is employed in a thermal reclaimer apparatus constructed in accordance with the present invention.

In the right portion of the cylindrical chamber 26, on the other hand, three sets of comb-like members 48, each set being arranged in a group of three, are preferably provided. In FIG. 3, only one of the group of three of a given set of comb-like members 48 has been illustrated in the interest of maintaining clarity of illustration in the drawing. The sets of comb-like members 48 are suitably positioned in the interior of the cylindrical chamber 26 so as to be located in equally spaced relation around the circumference thereof. Although the cylindrical chamber 26 is described as embodying three sets of comb-like members 48, it is to be understood that the exact number of comb-like members 48 with which a cylindrical chamber such as the chamber 26 is provided is a function of the size of the cylindrical chamber 26. As best seen in FIG. 5, each individual one of the comb-like members 48 of each group thereof is in turn inclined at the free end 48a thereof and projects into the interior of the cylindrical chamber 26. The inclined ends of the comb-like members 48 function to pick up out of the used foundry sand any lumps that may be present therein and to cause such lumps to free fall, i.e., drop, against the interior side walls of the cylindrical chamber 26 as the latter rotates whereby these lumps are made to break up.

The function of the pin-like members 46 and the comb-like members 48 is to cause a continual turning over, i.e., tumbling of the used foundry sand and of the material contained therein and to cause lumps in the used foundry sand to break up as the used foundry sand traverses the length of the cylindrical chamber 26. This is to insure that no portion of the sand remains unexposed, which in turn could lead to an incomplete removal of the organic matter from the used foundry sand. Upon reaching the right hand, as viewed with reference to FIG. 3, of the cylindrical chamber 26, the used foundry sand minus the organic matter, which has been burned away in the cylindrical chamber 26, exits from the latter, and thus also from the thermal reclaimer apparatus 14. More specifically, in accord with the illustrated embodiment of the thermal reclaimer apparatus 14, a suitable opening denoted by the reference numeral 50 in FIG. 3 is provided in surrounding relation to the burner pipe 40. It is through this opening 50 that the used foundry sand from which the organic matter has been removed passes from the cylindrical chamber 26 of the thermal reclaimer apparatus 14.

With further reference to FIG. 3, it can be seen therefrom that suitable insulation 52 is provided in surrounding relation to the opening 32 through which the used foundry sand enters the cylindrical chamber 26. The insulation 52 cooperates with the inner wall of the cylindrically shaped housing 24 to establish a form of seal therebetween, in addition to performing an insulative function, i.e., preventing heat from escaping to the exterior of the cylindrical chamber 26. Similarly, at the other end of the cylindrically shaped housing 24, insulation 54 is provided. The insulation 54, in a manner analogous to that of the insulation 52, is effective to establish a form of seal between the inner wall of the cylindrically shaped housing 24 and the pipe-like member that defines the opening 50 through which the used foundry sand passes from the cylindrical chamber 26.

Figure 6:
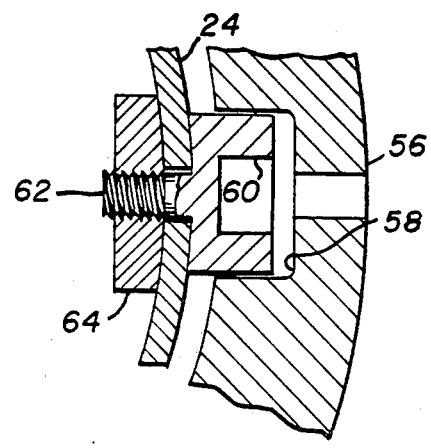
FIG. 6 is a cross-sectional view of a portion of the cylindrical chamber of a thermal reclaimer apparatus constructed in accordance with the present invention, illustrating the manner in which the support of the cylindrical chamber is effected.

Referring now in particular to FIG. 6 of the drawing, there is depicted therein the structure by which the housing 24 is suitably supported such that the latter is capable of being rotated while yet also being free to undergo thermal expansion. To this end, a flange member, denoted by the reference numeral 56 in FIGS. 6 and 3 is suitably positioned in juxtaposed relation to an end face of the cylindrically shaped housing 24. The flange member 56 has suitably formed therein a plurality of openings 58 (only one of which is depicted in FIG. 6). A slide button 60 is suitably dimensioned so as to be receivable in the opening 58. The slide button 60 is suitably fastened to the housing 24 by means of a fastener 62 that passes therethrough and is threadedly engaged in a washer-like member 64 which is suitably affixed to the housing 24 such as by being welded thereto. Accordingly, the slide button 60 is free to move into the opening 58 in response to the thermal expansion of the housing 24. That is, the slide button 60 is free to move both laterally and radially within the opening 58. To this end, the opening 58 is suitably dimensioned in a radial direction as best understood with reference to FIG. 6, as well as in a lateral direction, the latter not being depicted in FIG. 6 in the interest of maintaining clarity of illustration therein.

For purposes of completing the description herein of the thermal reclaimer apparatus 14 of FIG. 3, a summary will now be had of the mode of operation thereof. To this end, the used foundry sand containing the organic matter is fed at a controlled rate by hydraulic means 34 through the opening 32 into the cylindrical chamber 26. The hydraulic means 34 may be made to operate either automatically or manually. As the used foundry sand traverses the length of the cylindrical chamber 26, the cylindrically shaped housing 24 rotates while simultaneously hot gases exit from the end 40a of the burner pipe 40. The used foundry sand if the metal contained therein is of a ferrous nature is thus heated by these hot gases to a temperature, e.g., 1300° F., sufficient to effect the burning away of the organic matter contained therein, while the metal of a ferrous nature that the used foundry sand also contains is not adversely affected by the temperature to which the sand is heated. On the other hand, if the metal which the used foundry sand contains is of a nonferrous nature, such as aluminum or zinc which has a melting temperature of less than 1500° F., the used foundry sand is heated to a lesser temperature, e.g., 900° F. in addition to requiring multiple passes through the chamber 26. In this context, the organic matter is itself combustible and thus serves to provide some of the fuel required for the burning thereof. The residence time of the used foundry sand is a function in part of the speed of rotation of the cylindrically shaped housing 24 as well as the rate at which the used foundry sand is fed into the cylindrical chamber 26. To this end, the residence time to which the used foundry sand desirably is subjected must be preestablished. Further, the amount of used foundry sand that can be treated for removal of organic matter in a given period of time is a function of the volume of the cylindrical chamber 26.

Continuing, as the used foundry sand moves from one end to the other of the cylindrical chamber 26, it is constantly being turned over through the action of the pin-like members 46 and the comb-like members 48 so that all of the sand is exposed and lumps in the used foundry sand are broken up whereby to insure the complete removal of the organic matter that is contained therein. The used foundry sand from which the organic matter has been removed exits from the cylindrical chamber 26 through the opening 50. Finally, note is made of the fact that some of the air to support combustion comes into the cylindrical chamber 26 with the used foundry sand through the opening 32. Additional combustion air is supplied into the cylindrical, i.e., combustion, chamber 26 through a pipe-like member 66 that surrounds the burner pipe 40 for a portion of the length of the latter. In addition to its use for combustion purposes, the air that flows into the cylindrical chamber 26 from the pipe-like member 66 performs two other functions. First, it serves to blow the gases, which are generated as the organic matter that the used foundry sand contains, is being burned up, back into the cylindrical chamber 26 where these gases are exposed further to the combustion process. Secondly, it inhibits the escape of the used foundry sand from the cylindrical chamber 26 other than through the opening 50.

Thus, in accordance with the present invention there has been provided a new and improved form of thermal reclaimer apparatus. Moreover, the subject thermal reclaimer apparatus of the present invention is particularly suited for purposes of effecting the thermal reclamation of used foundry sand. In addition, in accord with the present invention a thermal reclaimer apparatus is provided which is operative for purposes of heating used foundry sand to a predetermined temperature for a preeselected period in order to accomplish the burning away of the organic matter that the used foundry sand contains. Further, the subject thermal reclaimer apparatus of the present invention can be cooperatively associated in operative relation with the other components that together comprise a system for the reclamation of used foundry sand. Additionally, in accordance with the present invention a thermal reclaimer apparatus is provided which effects the burning away of the organic matter contained in the used foundry sand without producing fumes that would pose either a danger to the personnel attending to the operation of the thermal reclaimer apparatus or would constitute a pollutant if exhausted to the atmosphere. Penultimately, the subject thermal reclaimer apparatus of the present invention embodies means operative for insuring that all of the used foundry sand which enters the thermal reclaimer apparatus is exposed to the combustion process. Lastly, in accordance with the present invention a thermal reclaimer apparatus is provided which is characterized in the fact that it is easy to employ, is reliable in operation, yet is relatively inexpensive to provide.

While only one embodiment of my invention has been shown, it will be appreciated that modifications thereof some of which have been alluded to hereinabove, may still be readily made thereto by those skilled in the art. I, therefore, intend by the appended claims to cover the modifications alluded to herein as well as all other modifications, which fall within the true spirit and scope of my invention.

I claim:

1. A thermal reclaimer apparatus for effecting the removal of organic matter from used foundry sand, which contains organic matter, metal of either a ferrous or nonferrous nature, dust and fines, comprising:

a. means including a plurality of surfaces defining a chamber having a first opening formed in one of said plurality of surfaces and a second opening formed in another one of said plurality of surfaces, said chamber being operative to retain the used foundry sand therein while the used foundry sand is being heated to a predetermined temperature for a preestablished period of time in order to accomplish the burning away of organic matter contained in the used foundry sand;

b. feed means cooperatively associated with said chamber, said feed means including a member supported for movement within said first opening of said chamber, said member embodying a cross-sectional area substantially equivalent to the cross-sectional area of said first opening such that said member essentially seals off said first opening when said member is positioned therewithin, said feed means being operative as a consequence of the movement of said member in said first opening to effect the injection into said chamber through said first opening of used foundry sand containing organic matter;

c. burner means cooperatively associated with said chamber, said burner means including a burner pipe supported so as to project through said second opening a predetermined distance into said chamber, said burner pipe having a cross-sectional area less than the cross-sectional area of said second opening so as to provide an annular space surrounding said burner pipe through which the discharge of the used foundry sand from said chamber is effected, said burner means being operative to provide a hot gas flow into said chamber sufficient to selectively heat the used foundry sand to a first temperature when the used foundry sand contains metal of a ferrous nature and to a second temperature when the used foundry sand contains metal of a nonferrous nature for purposes of accomplishing the burning away of organic matter contained in the used foundry sand; and d. rotating means cooperatively associated with said chamber, said rotating means being operative to effect the rotation of said chamber as the used foundry sand in said chamber is being heated by the hot gas flow from said burner means.

2. The thermal reclaimer apparatus as set forth in claim 1 wherein said feed means comprises hydraulic means and said member of said feed means comprises a plunger operative to force the used foundry sand through said first opening into said chamber.

3. The thermal reclaimer apparatus as set forth in claim 1 wherein the hot gas flow from said burner means is operative to heat the used foundry sand to a temperature of approximately 1300° F. when the metal contained in the used foundry sand is of a ferrous nature.

4. The thermal reclaimer apparatus as set forth in claim 1 wherein the hot gas flow from said burner means is operative to heat the used foundry sand to a temperature of approximately 900° F. when the metal contained in the used foundry sand is of a nonferrous nature, having a melting temperature of less than 1500° F.

5. The thermal reclaimer apparatus as set forth in claim 1 wherein the hot gas flow from said burner means is operative to heat the used foundry sand for a period of approximately two hours in said chamber.

6. The thermal reclaimer apparatus as set forth in claim 1 further comprising tumbling means mounted in said chamber, said tumbling means being operative to impart a tumbling action to the used foundry sand in said chamber.

7. The thermal reclaimer apparatus as set forth in claim 6 wherein said tumbling means includes a plurality of pin-like members mounted in a first portion of the interior of said chamber.

8. The thermal reclaimer apparatus as set forth in claim 7 wherein said tumbling means includes a plurality of comb-like members mounted in a second portion of the interior of said chamber, said comb-like members being operative to pick up out of the used foundry sand lumps present therein and to cause the lumps to free fall within the interior of said chamber so as to effect a breaking up of the lumps.

9. The thermal reclaimer apparatus as set forth in claim 1 further comprising support means operative to support said chamber for movement in all directions.

* * * * *